Jan. 8, 1929.
J. O. LEWIS
1,698,309
RESILIENT WHEEL
Filed Feb. 2, 1928
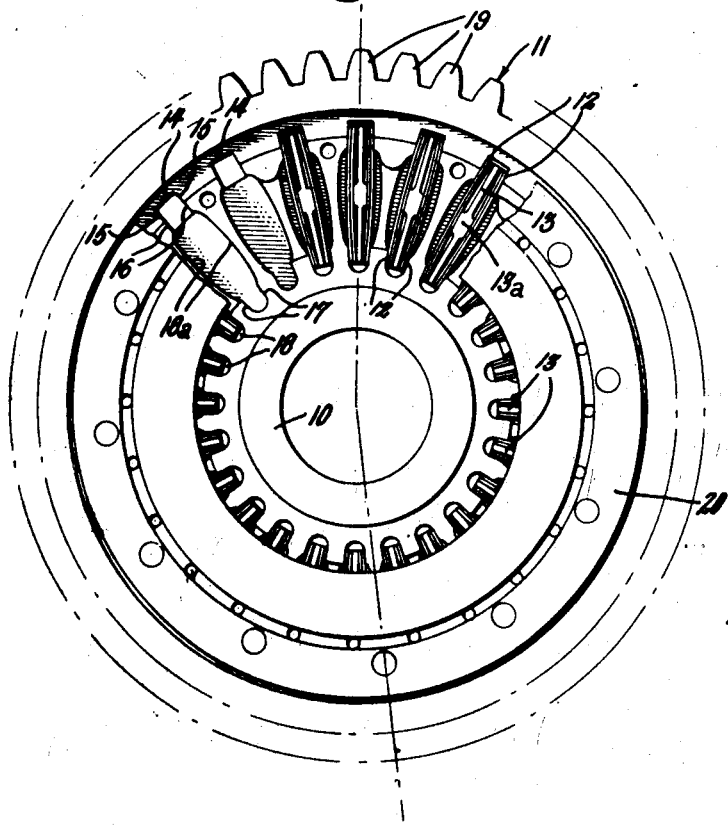
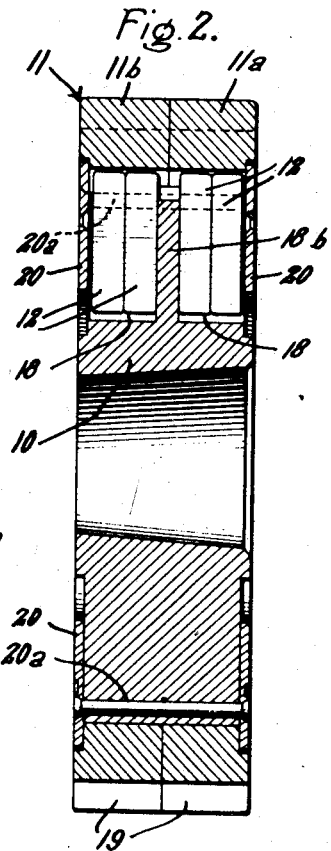
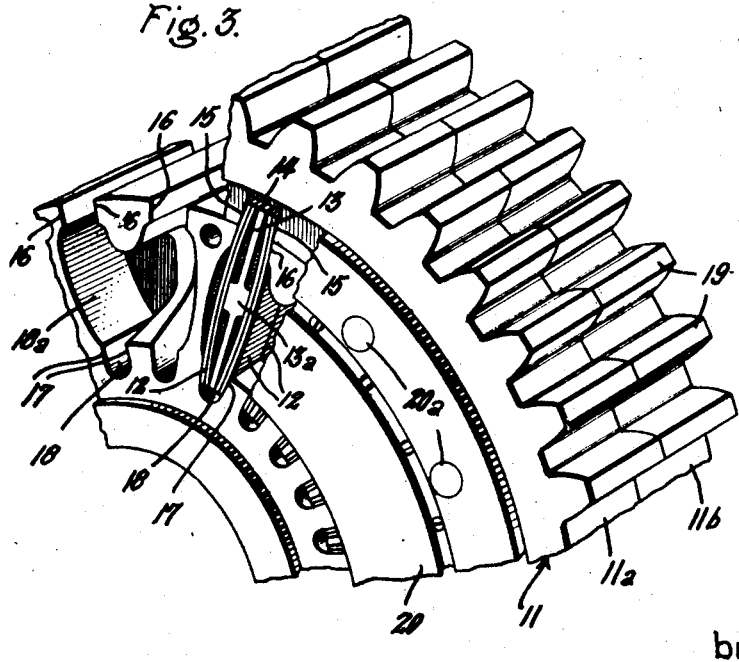
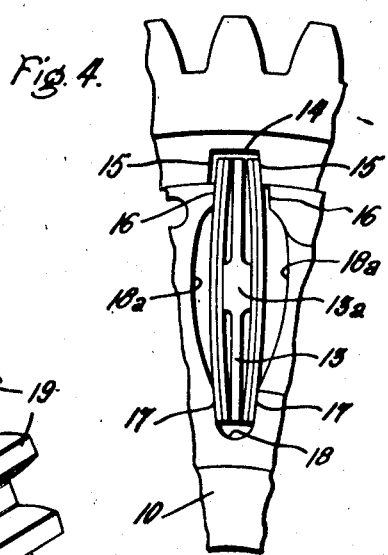
Inventor:
John O. Lewis,
by Charles E. Tullar
His Attorney.

Patented Jan. 8, 1929.

1,698,309

UNITED STATES PATENT OFFICE.

JOHN O. LEWIS, OF WESLEYVILLE, PENNSYLVANIA, ASSIGNOR TO GENERAL ELECTRIC COMPANY, A CORPORATION OF NEW YORK.

RESILIENT WHEEL.

Application filed February 2, 1928. Serial No. 251,437.

My invention relates to resilient wheels of the type comprising separate hub and rim members connected together by cushioning devices to absorb the shocks to which the rim or hub may be subjected.

An object of my invention is to provide a wheel construction of this character in which leaf springs are employed forming a resilient connection between the hub and rim members in either direction of rotation of the wheel, and in which each of the leaf springs is subjected to a bending stress during rotation of the wheel in either direction. I accomplish this by arranging one or more pairs of leaf springs with adjacent ends of each pair in spaced relation, which are separated by a spacing element engaging the springs intermediate the ends thereof, the springs and spacing elements being arranged between abutments formed on said hub and rim members engaging said springs at each end thereof and on opposite sides of said spacing element. Arranging the springs and abutments in this manner effectively utilizes all of the springs during rotation of the wheel in either direction by flexing the springs of each pair toward each other. A wheel of this form can be readily constructed as it is only necessary in making the wheel to form the hub and rim members with suitably arranged abutments and place the springs with the spacing elements between the abutments. Moreover, such a construction is particularly advantageous for use in connection with wheels, such as gears, having a rim of thin cross section of hard material, possessing the requisite wearing qualities and tooth strength, because the side walls of shallow slots cut in the rim members form the abutments for engaging the springs which decreases the amount of machine work required on the rim as compared with prior constructions, and lessens the cost of making the resilient wheel as the hard material of the rim is difficult to machine.

My invention will be more fully set forth in the following description referring to the accompanying drawing and the features of novelty which characterize my invention will be pointed out with particularity in the claims annexed to and forming a part of this specification.

In the drawing, Fig. 1 is an end elevation of a resilient wheel, shown in the form of a gear, embodying my invention; Fig. 2 is a section on the line 2—2 of Fig. 1; Fig. 3 is a perspective view partly broken away of the gear shown in Figs. 1 and 2, and Fig. 4 is a view showing how the springs deflect under load.

Referring to the drawing, the resilient wheel which I have shown embodying my invention is a gear having a hub member 10 and a rim member 11 slidably fitted thereon which are connected together by a plurality of pairs of springs 12 made of one or more leaves which prevent mechanical shocks being applied to the gear rim.

In order to effectively utilize the springs 12 during rotation of the gear in either direction, they are separated by a spacing element 13 having a thickened portion 13$^a$ engaging them intermediate the ends thereof and arranged between abutments on the rim and hub members in such manner that the springs are flexed toward each other upon relative movement between the hub and rim members in either direction of rotation. The abutments on the gear rim may be formed in any suitable manner but as the gear rim is made of hard material which is difficult to machine, I prefer to cut shallow slots 14 therein, the side walls of which form abutments 15 engaging the ends of the springs 12 which are in spaced relation. The radially spaced abutments 16 and 17 on the hub member are preferably made by forming deep slots 18 therein which are in radial alignment with the shallow slots 14 and which are enlarged at 18$^a$ between the abutments to provide clearance spaces into which the springs 12 can be deflected. The abutments 16 and 17 are radially spaced apart on each side of the slots 18 so as to engage the springs adjacent both ends thereof and on both sides of the spacing element 13.

The springs extend from the abutments 16 and 17 in the deep slots 18 into engagement with the abutments 15 formed in the shallow slots 14 in the rim member and are put in place under an initial flexural stress so as to prevent any lost motion between the hub and rim members. This is provided for by making the space between the abutments 15, 16 and 17 on each side of the shallow and deep slots such that the ends of the springs 12 must be flexed toward each other slightly by suitable clamps, or the like, before they can be placed between the abutments. The arrangement of the abutments is such that the ends of the springs 12 and the spacing element 13 are spaced apart when they are placed between the abutments 15 and 16 sufficiently to give the desired relative angular movement between the rim and hub members 10 and 11 against the resisting force of the springs 12. The ends of the springs and spacing element are slidably fitted between the abutments 17 although they may be slightly spaced apart if desired, to prevent wear. Extending the spacing element 13 between the ends of the springs 12 enables me to retain the spacing elements in place without holes as projections on the springs which simplifies their construction and reduces the liability of breakage due to localized stresses.

In a gear of this form it frequently occurs that the gear gets out of alignment with the face of the gear with which it engages, which causes the pressure on the teeth 19 to become localized at one point instead of being distributed along the entire length thereof which often breaks the teeth. This is prevented in my improved gear by making the gear rim 11 in two parts 11$^a$ and 11$^b$, each of which engage a separate set of the springs 12 arranged in the slots 18 at each end of the hub member 10 which are separated by a reinforcing web 18$^b$. The springs 12 and spacing elements 13 are retained in the shallow and deep slots 14 and 18 by end plates 20 which are secured to the hub members at 20$^a$. In addition to retaining the springs 12 and spacing elements 13 in place, the end plates 20 also extend over the ends of the sections 11$^a$ and 11$^b$ of the gear rim for retaining them in longitudinal alignment with the springs 12 and hub members 10.

In this construction I prefer to make the springs 12 strong enough to prevent relative angular movement between the hub and rim members when the normal torque is being transmitted between them. However, if the torque is increased suddenly by a change in load on the gear, the springs 12 will be deflected and cushion the resulting shock on the gear. In deflecting the springs in this manner the gear rim 11 moves angularly relative to the hub member 10 unseating the leading abutment 15 with respect to the direction of relative movement of the rim and hub members from the ends of the springs 12, and the trailing abutment 16, as shown in Fig. 4. This loads the leading spring between the enlarged portion 13$^a$ of the spacing element and the leading abutments 16 and 17, and loads the trailing spring 12 between the trailing abutment 17 of the hub member 10, the portion 13$^a$ of the spacing element which transmits the load from one spring to the other, and the trailing abutment 15.

It will thus be seen that I have produced a simple resilient wheel construction which can be readily constructed and which effectively utilizes all the springs therein during rotation in either direction.

Although I have described my resilient wheel in connection with a gear construction, it may be used for a resilient coupling in any other suitable device. I do not desire to be limited, therefore, to the particular construction shown and described except as defined in the appended claims.

What I claim as new and desire to secure by Letters Patent of the United States is:

1. A resilient wheel comprising a hub member, an annular rim member, and means for forming a driving connection between said members comprising a pair of leaf springs arranged with adjacent ends in spaced relation, a spacing element engaging said springs intermediate the ends thereof, and abutments carried by said hub and rim members engaging said springs at each end thereof and on opposite sides of said spacing element for flexing said springs toward each other upon relative angular movement of said hub and rim members.

2. A resilient wheel including a hub member, an annular rim member, and means for forming a driving connection between said members comprising two leaf springs arranged with adjacent ends in spaced relation, a spacing element extending between the ends of said springs, said spacing element having a thickened portion engaging said springs intermediate the ends thereof, and abutments carried by said hub and rim members engaging said springs at each end thereof and on opposite sides of said spacing element for flexing said springs toward each other upon relative angular movement of said hub and rim members.

3. A resilient wheel including a hub member, an annular rim member, and means for forming a driving connection between said members comprising two leaf springs arranged with adjacent ends in spaced relation, a spacing element extending between both ends of said springs, said spacing element having a thickened portion engaging said springs intermediate the ends thereof, and abutments carried by said hub and rim members engaging said springs at each end thereof and on opposite sides of said spacing element for flexing said springs toward each other upon relative angular movement of said rim and hub members.

4. A resilient wheel including a hub member, an annular rim member, one of said members having a recess therein formed with radially spaced abutments on each side thereof, the other of said members having a recess formed with an abutment on each side thereof, two leaf springs arranged with adjacent ends in spaced relation and extending from the abutments in the recess in one of said members to the abutments in the recess in the other of said members, and a spacing element separating said springs, said spacing element engaging said springs between the radially spaced abutments in one of said rim and hub members so as to flex said springs toward each other upon relative angular movement of said rim and hub members.

5. A resilient wheel including a hub member, an annular rim member, said hub member having a recess formed therein with radially spaced abutments on each side thereof, said rim member having a recess formed with an abutment on each side thereof, two leaf springs arranged with adjacent ends in spaced relation, said springs extending from the abutments in said hub member to the abutments in said rim member, and a spacing element separating said springs, said spacing element engaging said springs between the radially spaced abutments in said hub member so as to flex said springs toward each other upon relative angular movement of said rim and hub members.

6. A resilient wheel including a hub member having axially spaced recesses separated by a circumferentially extending reinforcing web, radially spaced abutments on both sides of each of said recesses, an annular rim member having a recess therein formed with an abutment on each side thereof and being arranged so that the recess in the same is aligned with the recesses in said hub member, a pair of leaf springs arranged in each of the recesses in said hub member with adjacent ends in spaced relation and extending from the abutments in said hub member to the abutments in said rim member, and a spacing element separating said springs and engaging them between the radially spaced abutments of said hub member so as to flex said springs toward each other upon relative angular movement of said rim and hub members.

7. A resilient wheel including a hub member having recesses at both ends thereof and a reinforcing web separating said recesses, radially spaced abutments on both sides of each of said recesses, an annular rim member having a recess therein formed with an abutment on each side thereof and being arranged so that the recess in the same is aligned with the recesses in said hub member, pairs of leaf springs arranged in each of the recesses in said hub member with adjacent ends in spaced relation and extending from the abutments in said hub member to the abutments in said rim member, a spacing element separating said springs and engaging them between the radially spaced abutments in said hub member so as to flex said springs toward each other upon relative angular movement of said rim and hub members, and end plates secured to said hub member for retaining said springs and said spacing elements therein.

8. A resilient wheel including a hub member having a recess at each end thereof and a reinforcing web separating said recesses, radially spaced abutments on both sides of each of said recesses, a rim member formed in two adjacent annular sections surrounding said hub member, each of said annular sections having a recess therein formed with an abutment on each side in alignment with the abutments in said hub member, a pair of leaf springs arranged in each of the recesses in said hub member with adjacent ends in spaced relation and extending from the abutments in said hub member to the abutments in said rim sections, and a spacing element separating said springs and engaging them between the radially spaced abutments of said hub member so as to flex said springs toward each other upon relative angular movement of said rim and hub members.

9. A resilient wheel including a hub member having a recess at each end thereof and a reinforcing web separating said recesses, radially spaced abutments on both sides of each of said recesses, a rim member formed in two adjacent annular sections surrounding said hub member, each of said annular sections having a recess therein formed with an abutment on each side in alignment with the abutments in said hub member, a pair of leaf springs arranged in each of the recesses in said hub member with adjacent ends in spaced relation and extending from the abutments in said hub member to the abutments in said rim member, a spacing element separating said springs and engaging them between the radially spaced abutments of said hub member so as to flex said springs toward each other upon relative angular movement of said rim and hub members, and means including end plates for retaining said springs in said recesses and said rim sections on said hub member.

10. A resilient wheel including a hub member, an annular rim member, and means for forming a driving connection between said members comprising two leaf springs arranged with adjacent ends in spaced relation, a spacing element extending between the ends of said springs, said spacing element having a thickened portion engaging said springs intermediate the ends thereof, and abutments carried by said hub and rim members engaging said springs at each end thereof and on opposite sides of said spacing element for flexing said springs toward each other upon relative angular movement of said hub and rim members, the space between opposing abutments and the thickness of said spacing element being proportioned to subject said springs to a flexural stress when said abutments are in alignment for preventing lost motion between said hub and rim members.

11. A resilient wheel including a hub member, an annular rim member, and means for forming a driving connection between said members comprising two leaf springs arranged with adjacent ends in spaced relation, a spacing element extending between both ends of said springs, said spacing element having a thickened portion engaging said springs intermediate the ends thereof, and abutments carried by said hub and rim members engaging said springs at each end thereof and on opposite sides of said spacing element for flexing said springs toward each other upon relative angular movement of said rim and hub members, the space between opposing abutments and the thickness of said spacing element being proportioned to subject said springs to a flexural stress when said abutments are in alignment for preventing lost motion between said hub and rim members.

In witness whereof, I have hereunto set my hand this 31st day of January, 1928.

JOHN O. LEWIS.